Figure 4:
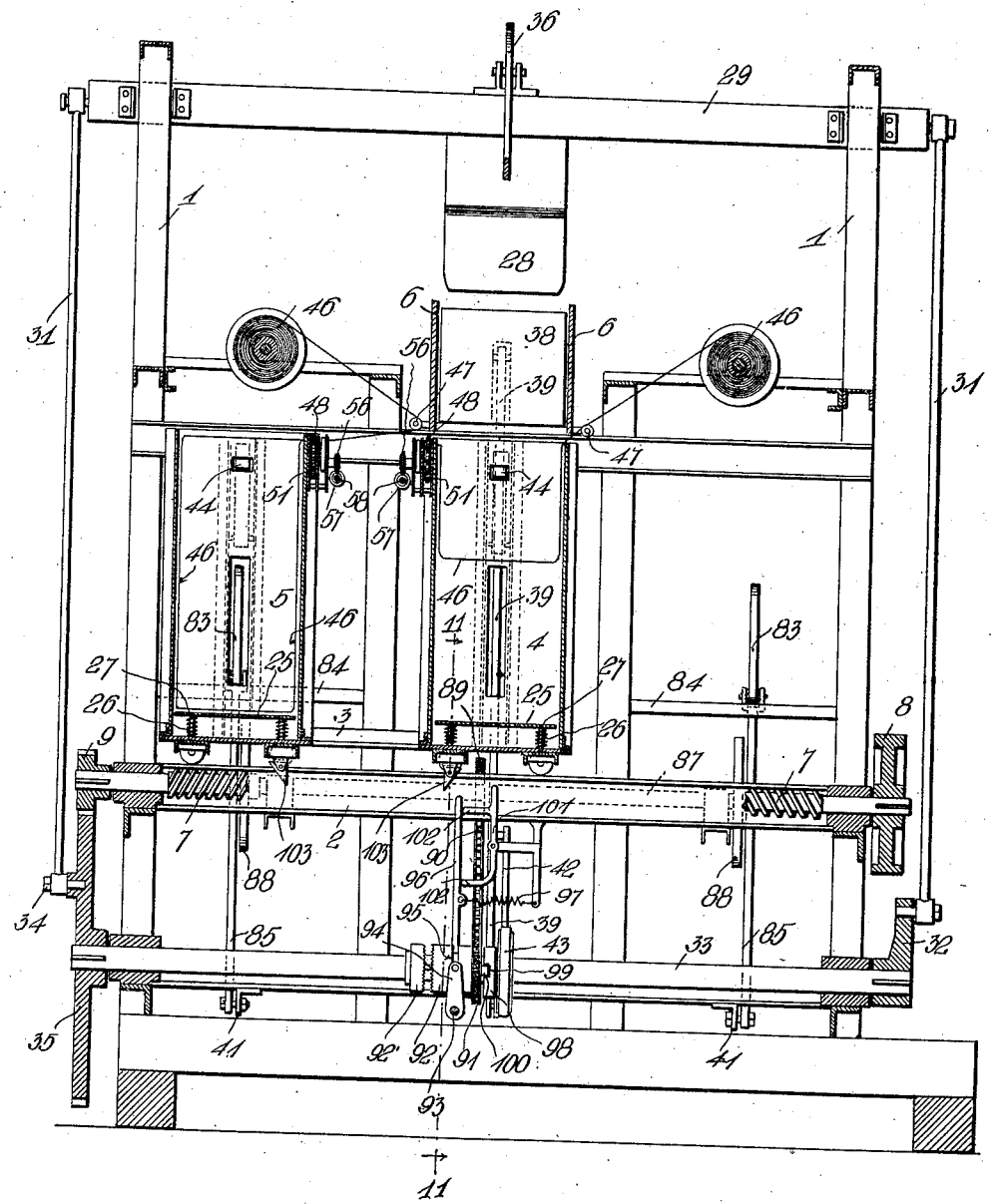

C. L. INMAN.
HAY BALING MACHINE.
APPLICATION FILED MAR. 31, 1910.
986,986.
Patented Mar. 14, 1911.
6 SHEETS—SHEET 1.
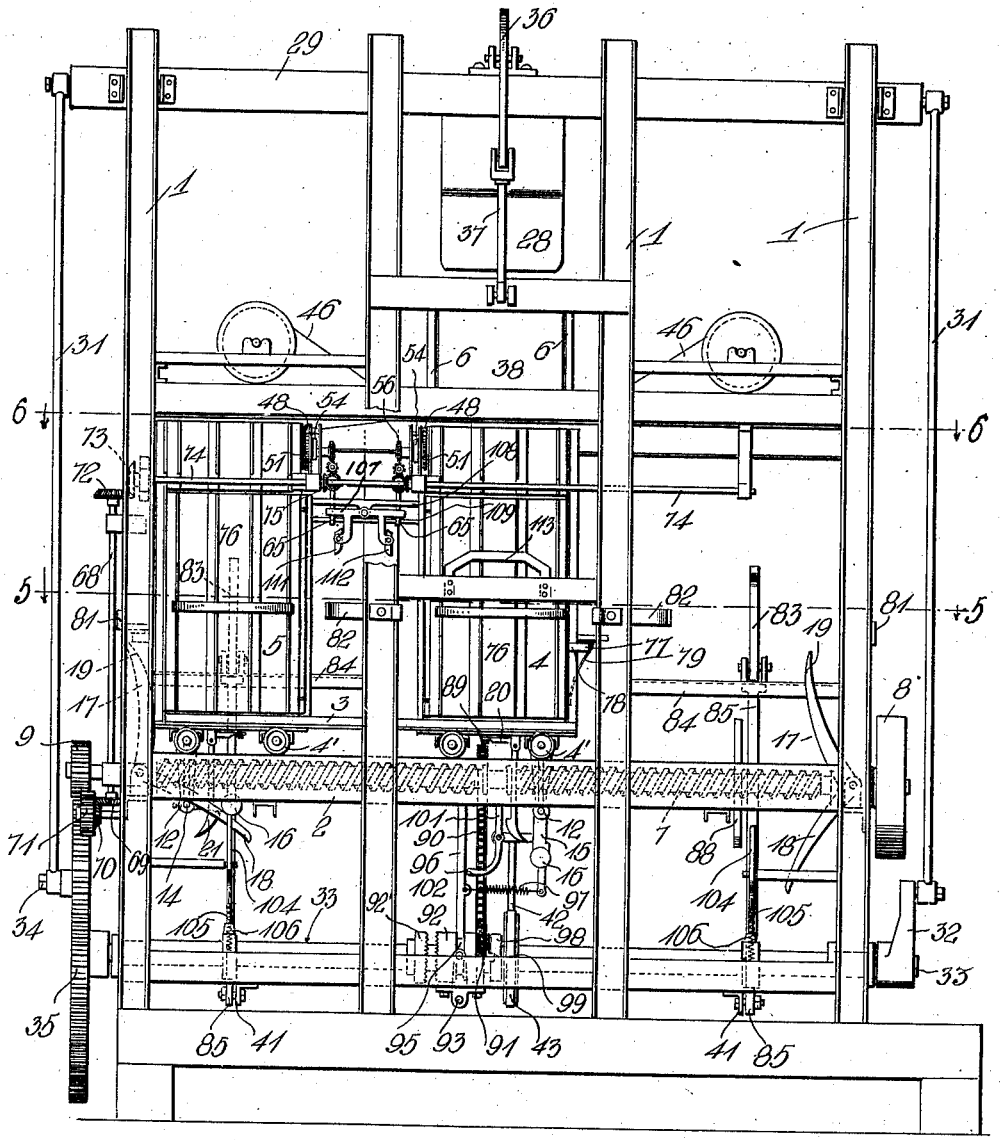
Witnesses
Inventor
C. L. Inman
by H. B. Willson & Co.
Attorneys C. L. INMAN.
HAY BALING MACHINE.
APPLICATION FILED MAR. 31, 1910.
986,986.
Patented Mar. 14, 1911.
6 SHEETS—SHEET 2.
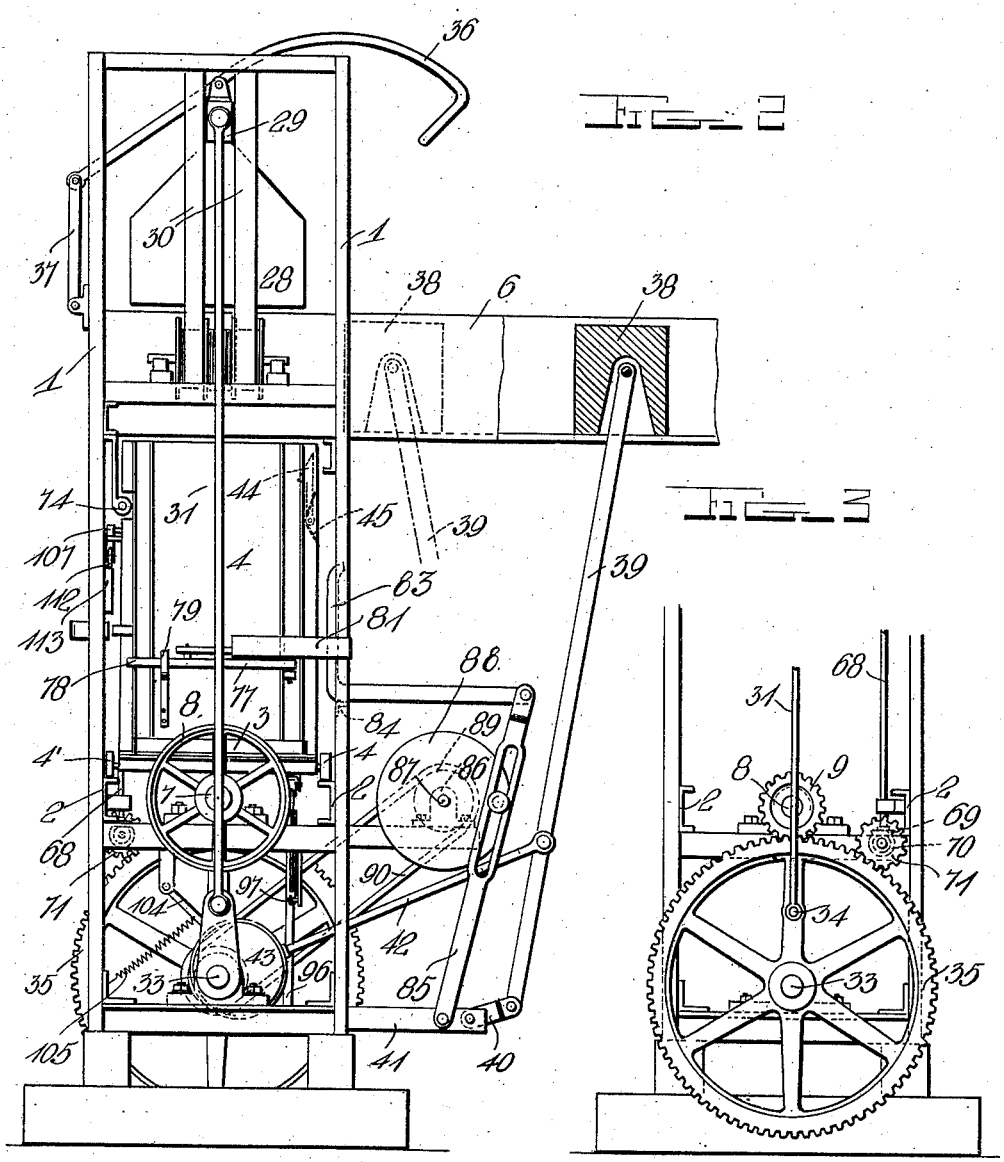

C. L. INMAN.
HAY BALING MACHINE.
APPLICATION FILED MAR. 31, 1910.

986,986.

Patented Mar. 14, 1911.
6 SHEETS—SHEET 3.

Witnesses
C. H. Griesbauer

Inventor
C. L. Inman
by H. B. Willson & Co.
Attorneys

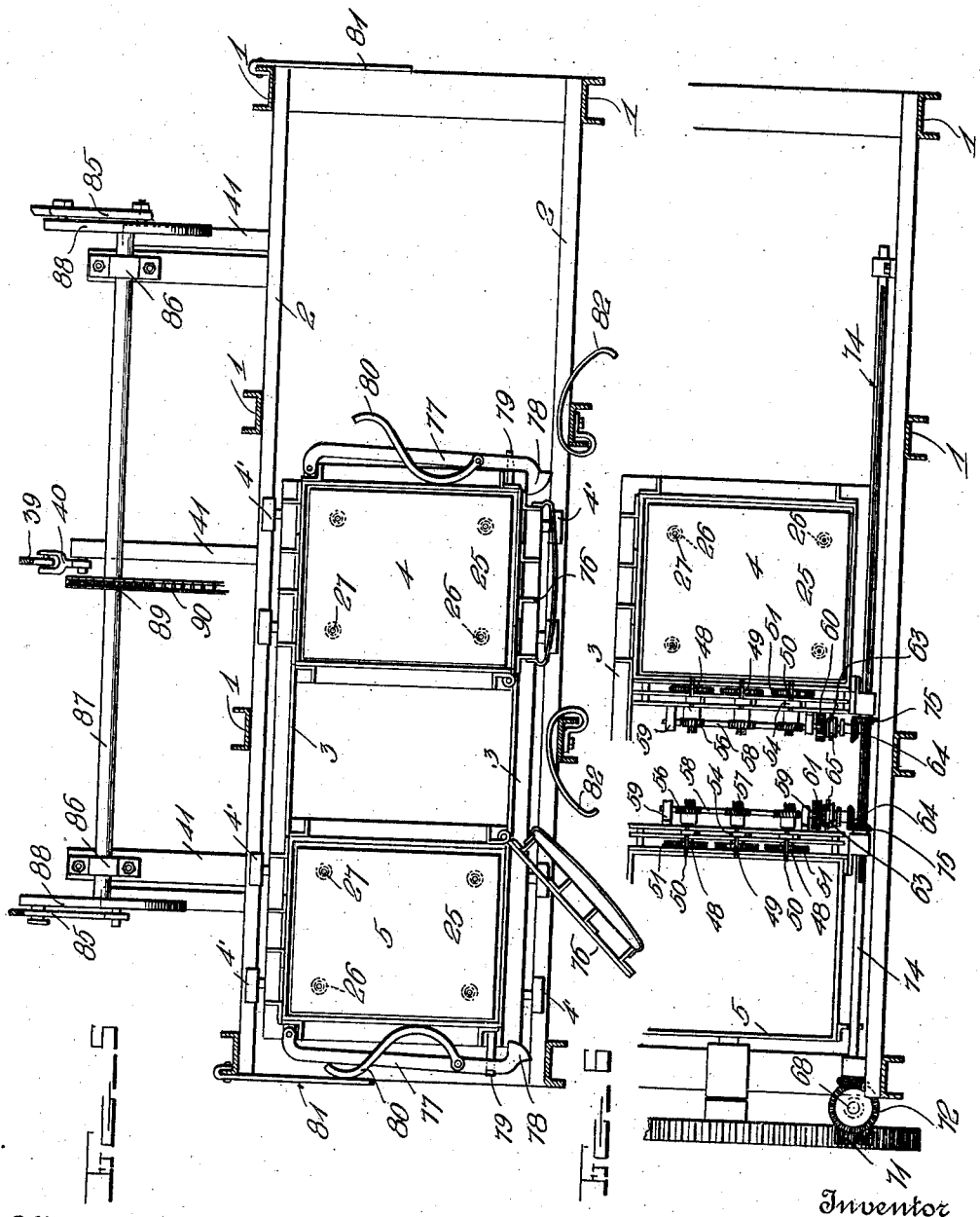

C. L. INMAN.
HAY BALING MACHINE.
APPLICATION FILED MAR. 31, 1910.
986,986.
Patented Mar. 14, 1911.
6 SHEETS—SHEET 5.
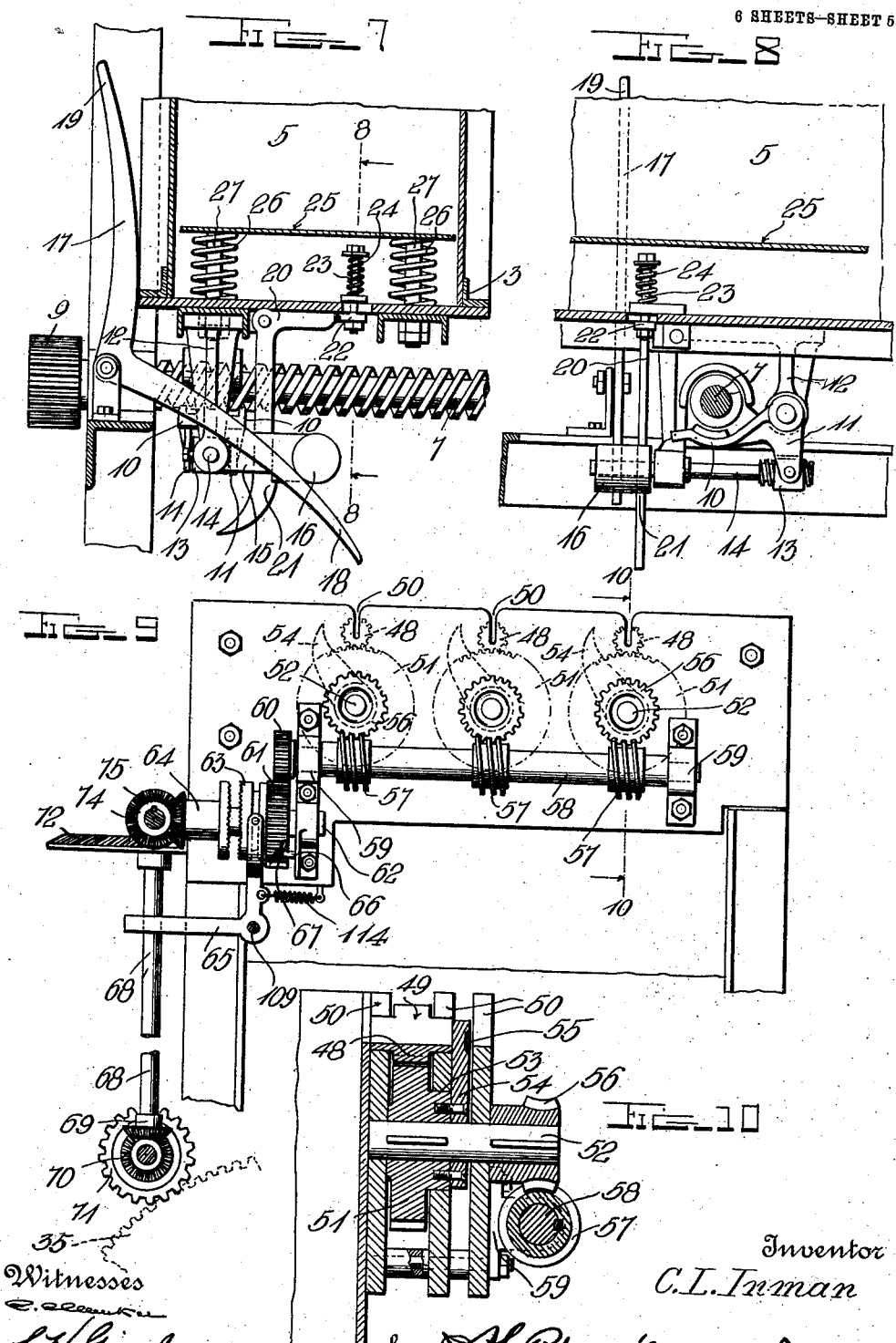
Witnesses
Inventor
C. L. Inman
by
Attorneys

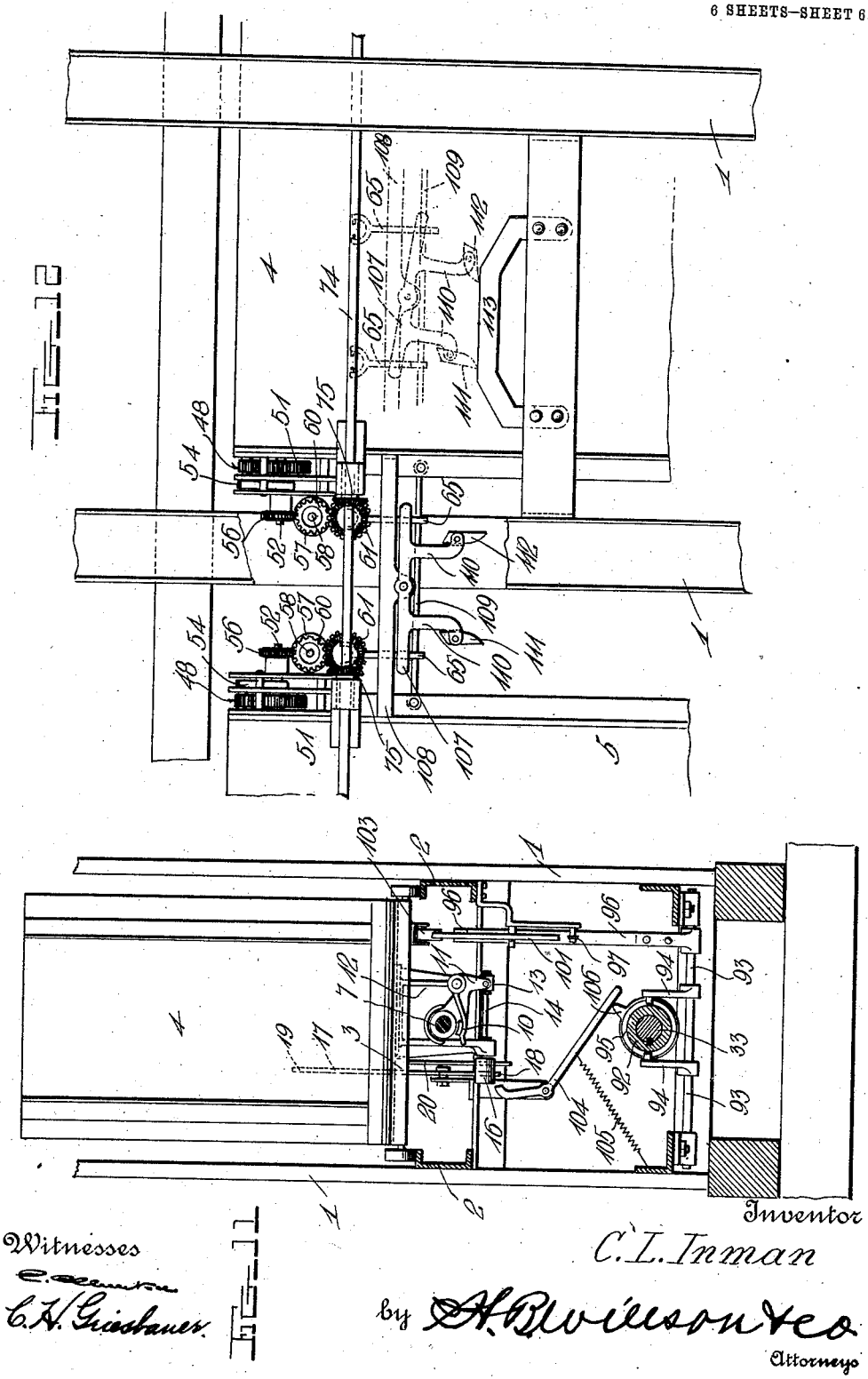

UNITED STATES PATENT OFFICE.

CLIFTON L. INMAN, OF PORTLAND, OREGON.

HAY-BALING MACHINE.

986,986.     Specification of Letters Patent.     Patented Mar. 14, 1911.

Application filed March 31, 1910. Serial No. 552,620.

*To all whom it may concern:*

Be it known that I, CLIFTON L. INMAN, a citizen of the United States, residing at Portland, in the county of Multnomah and State of Oregon, have invented certain new and useful Improvements in Hay-Baling Machines; and I do declare the following to be a full, clear, and exact description of the invention, such as will enable others skilled in the art to which it appertains to make and use the same.

This invention relates to improvements in hay baling machines.

The object of the invention is to provide a machine of this character in which the bale forming mechanism, the wiring mechanism, the bale ejecting mechanism and all other working parts of the machine operate automatically and in the proper sequence.

Another object is to provide a baling machine in which two bales are formed and having means whereby, when one of said bales is being formed, the wires of the other bale are being fastened and the bale ejected.

With the foregoing and other objects in view, the invention consists of certain novel features of construction, combination and arrangement of parts as will be more fully described and particularly pointed out in the appended claims.

In the accompanying drawings, Figure 1 is a side elevation of one side of the machine; Fig. 2 is an elevation of one end; Fig. 3 is a detail elevation looking at the opposite end; Fig. 4 is a central vertical longitudinal section; Fig. 5 is a horizontal section on the line 5—5 of Fig. 1; Fig. 6 is a horizontal cross section on the line 6—6 of Fig. 1; Fig. 7 is an enlarged detail sectional elevation of the bottom of a baling chamber and mechanism contiguous thereto; Fig. 8 is a detail section on the line 8—8 of Fig. 7; Fig. 9 is an enlarged detail plan view of the wire twisting and cutting mechanism; Fig. 10 is a detail section on the line 10—10 of Fig. 9; Fig. 11 is a detail section on the line 11—11 of Fig. 4; Fig. 12 is an elevation, more or less diagrammatic, of the shifting mechanism for actuating the twisting and cutting devices.

Referring more particularly to the drawings, 1 denotes the main frame of the machine, said frame being preferably constructed of a series of upright channel iron side bars which are connected together by a series of longitudinally disposed parallel side bars and end cross bars, said side and end bars being also preferably formed of channel iron. In practice, the main frame will be mounted upon a suitable truck or provided with wheels (not shown) whereby the machine may be readily transported.

One of the longitudinal channel iron bars on each side of the frame forms a track bar 2. On the track bars 2 is supported and adapted to travel a baling frame 3, said frame being provided with supporting rollers 4', which engage and run on the track bars 2. The baling frame 3 is preferably formed of angle iron bars and in the opposite ends of said frame are arranged baling chambers 4 and 5, in which the bales of hay are formed, as hereinafter described.

In the center of the upper portion of the main frame 1 above the baling chamber is arranged a feed box 6, which receives the hay to be pressed and from which the hay is forced down into the baling chambers by a suitable feeding and pressing mechanism hereinafter described.

In order to successively bring the baling chambers beneath the delivery end of the feed box and the feeding mechanism, I provide an automatic shifting mechanism for shifting the baling frame back and forth through the main frame of the machine. The shifting mechanism for the main frame comprises a feed screw or shaft 7 which is revolubly mounted in the frame 1 below the baling frame, as shown. The feed screw or shaft 7 is provided with a central bearing and on the opposite ends of the shaft are formed right and left-hand screw threads with which are automatically engaged frame operating devices hereinafter described. On one end of the shaft 7 is fixedly mounted a drive pulley 8, while on the opposite end thereof is mounted a spur gear pinion 9, the purpose of which will be hereinafter described.

The frame operating devices which engage the feed screw or shaft 7 comprise segmental blocks 10 on which are formed threads having a pitch corresponding to the pitch of the threads on the feed screw whereby when said blocks are brought into engagement with the threads of one end or the other of the feed screw, the baling frame will be moved in one direction or the other. The segmental blocks 10 are arranged each on one end of a bell crank lever 11, which is pivotally mounted in a suitable hanger or bracket 12 secured to the lower end of the baling frame adjacent to the opposite ends thereof and below each of the baling chambers 4 and 5. The opposite arm of the bell crank lever 11 is connected to an operating nut 13, which is operatively engaged with the threaded end of a short rock shaft 14 which is also revolubly mounted in the bracket or hanger 12. Fixedly mounted on the opposite end of the shaft 14 is a crank arm 15 having on its outer end a weight 16 which, when the arm 15 is released, will drop a suitable distance, thereby turning or rocking the shaft 14 which will cause the threaded outer end to move the nut 13 inwardly, thus rocking the bell crank lever 11 and bringing the threaded segmental block 10 into engagement with the feed screw, thereby operatively connecting the baling frame with said feed screw, whereby said frame will be moved in one direction or the other according to which end of the feed screw is engaged with an operating device.

In order to lift the weighted crank arm 15 and thereby reverse the movement of the parts controlled by said arm and thus release or disengage the segmental block 10 from the feed screw, when the baling frame has reached the limit of its movement or has been brought to a position wherein one or the other of the baling chambers is beneath the feed box, I provide suitable releasing devices, one of which is arranged at each end of the main frame 1 as shown. The releasing devices preferably comprise angle or bell crank levers 17, which are pivotally mounted in suitable brackets on the ends of the frame 1. The lower arms 18 of the levers 17 project downwardly in the path of movement of the weighted arms 15, while the upper arms or members 19 of the levers 17 project upwardly in the path of movement of the baling frame, whereby when said frame is moved into engagement with the arms 19 of one or the other of the levers 17, said lever will be rocked and the lower member thereof thus lifted, which movement will swing the weighted arms 15 upwardly and thus rock the shaft 14 to release the segmental blocks 10 from engagement with the feed screw, thereby stopping the movement of the baling frame.

In order to support the weighted arms 15 and hold the shifting mechanism controlled thereby in an inoperative position, I provide suitable supporting devices comprising bell crank levers 20, which are pivotally mounted on the under side of the baling frame and have on their downwardly extending arms catches 21, which are adapted to engage the crank arms 15 and thereby hold the same in an inoperative position when swung upwardly by the releasing devices 17, as hereinbefore described. The upper or horizontally disposed arms 22 of the bell crank levers 20 are connected at their outer ends with the lower ends of trip bolts or rods 23, which project upwardly through the main bottom of the baling frame and have arranged thereon coiled retracting springs 24, which normally hold the catches 21 in position to engage and support the arms 15.

In order to actuate the trip rods 23 and thereby automatically release the catch devices at the proper time for moving the baling frame, I provide a false bottom 25 in each of the baling chambers 4 and 5, said false bottoms being normally supported or held out of engagement with the trip rods 23 by stiff coiled springs 26 which are arranged on guide bolts 27 between the false bottom 25 and the main bottom of the baling frame. The springs 26 are of such strength as to resist the pressure of the hay in the baling chambers until the chambers are full and the hay sufficiently compressed therein by the feeding and pressing mechanism, at which time the pressure of the bale will force the false bottom 25 down in the baling chamber against the resistance of the springs 26 until said bottom engages the upper end of the trip rod or bolt 23, whereby the latter will be forced down against the pressure of the spring 24 thereon, thus rocking the bell crank lever 20 and disengaging the catch 21 thereof from the crank arm 15, thus allowing the weight 16 to swing said arm downwardly, thereby turning the rock shaft 14 one quarter of a revolution which will cause the threaded end of the shaft to shift the nut 13 in the proper direction for swinging the bell crank lever 11 upwardly and the threaded block 10 thereon into engagement with the feed screw, whereby the movement of said screw will draw the baling frame along in the proper direction until the weighted crank arm 15 is brought into engagement with the lifting and releasing devices at the opposite end of the main frame, as hereinbefore described.

The feeding and compressing mechanism comprises a main compressing plunger 28, which is connected with a cross beam 29, which is slidably mounted in a suitable guide-way 30 formed in the ends of the main frame 1. To the opposite ends of the beam 29 are connected pitman rods 31, the lower end of one of which is connected to a crank arm 32 fixedly mounted on one end of a plunger operating shaft 33 revolubly mounted in suitable bearings in the lower portion of the main frame 1. The pitman rod at the opposite end of the machine is connected at its lower end to a wrist pin 34 secured eccentrically to a spur gear 35, fixedly mounted on the adjacent end of the plunger operating shaft 33. The gear 35 is operatively engaged with the pinion 9 on the feed screw or shaft 7, whereby the plunger shaft 33 is driven in the proper direction by said feed screw. By thus connecting the plunger 28 with the feed screw, the plunger will be reciprocated at the proper time for forcing or compressing the hay in the baling chamber beneath the feed box.

The hay is forced down into the outer portion of the feed box by a suitable pressing lever 36 which is pivotally connected at one end to the upper end of a link 37, the lower end of which is pivotally connected to the rear side of the main frame as shown. The lever 36 is operatively connected with the plunger beam 29, whereby when said beam is raised and lowered, the lever 36 will be swung upwardly and downwardly, thus pressing the hay into the outer portion of the feed box. The hay, when thus pressed down into the feed box, is pushed out of the delivery end of the box and into the baling chamber beneath the main plunger 28 by a feeding plunger 38, which is slidably mounted in the feed box and is operatively connected to the upper end of an operating lever 39, the lower end of which is connected by a link 40 to a supporting arm or bracket 41 secured to and projecting from the lower portion of the main frame 1. The lever 39 is connected by a pitman rod 42 to a cam or eccentric 43 arranged on the plunger operating shaft 33, whereby the lever 39 and feeding plunger 38 are operated at the proper time to force a charge of hay into the baling chamber when the plunger 28 is in an elevated position. Arranged in the side bars of the baling chambers are catches 44 which are yieldingly held in operative position by springs 45, whereby when a charge of hay is forced down into the baling chamber by the plunger 28, the hay will be caught and held down by the catches 44 and thus prevented from following the plunger upwardly when the latter is retracted.

In order that the bales of hay may be bound when compressed, I provide binding wires which are passed around or engaged with the bales as they are being formed and which are secured to and cut off by a suitable twisting and severing mechanism hereinafter described. In the present instance, the bales are bound by three wires and for this purpose there are revolubly mounted in the main frame 1, adjacent to each end thereof, three reels or spools of wire 46. The wires from the reels 46 pass over guide pulleys 47 suitably mounted in the frame of the machine and from thence pass acrosss the baling chamber and have their ends secured in the fastening and severing mechanism secured to the opposite sides of the baling chambers as shown. The wires, when thus brought across the baling chambers, are forced downwardly in the form of loops by the hay as the latter is forced down into the baling chamber by the plunger 28. When the hay has been sufficiently compressed in the baling chambers to operate the feeding mechanism, as hereinbefore described, and the baling frame thereby shifted across the machine, the wires are brought over across the upper ends of the baling chamber and into engagement with the upper ends of the bales, and the wires again engaged with the fastening and severing mechanism where they are twisted together and severed, thus completing the formation of the bale.

The wire fastening and severing mechanism for each of the baling chambers consists of a series of twisting gears 48, one of which is provided for each of the reels. The gears 48 are revolubly mounted in suitable bearing brackets or plates secured to the inner sides of the baling chambers adjacent to their upper ends and in each of the gears 48 is formed a longitudinally disposed notch 49 which extends entirely through from end to end of the gears and extends into the gears a slight distance beyond the center thereof, as shown. The notches 49 are normally in alinement with notches 50 formed in the bearing plates of the gears 48 and the adjacent upper ends of the baling chambers, whereby the wires from the reels may be brought into engagement with the notches in the twisting gears, so that, when said gears are revolved, the ends of the wires are twisted together. The twisting gears 48 are engaged with operating gears 51 fixedly mounted on short shafts 52 journaled in the bearing plates of the gears 48. On one side of the gears 51 is formed an annular boss 53, which projects through the adjacent bearing plate, and to the outer side of the boss of each of the gears 51 is secured a wire severing and holding blade 54, which is revolved with the gears 51 and severs the wires after the same have been twisted together by the twisting gears 48. The severed ends of the wires from the reels, after being cut by the blades 54, are caught in a notch 55 formed in the outer side of the blade 54 and wedged between said notched portions of the blades and the adjacent wall of the bearing plate, thereby securely holding said ends of the wires, while they are being forced down into the baling chambers in the formation of the next bale of hay. The relative difference in the size between the twisting gears 48 and the operating gears 51 is such that the twisting gears are revolved four times, while the gears 51 and the severing blades 54 are making one revolution, so that the ends of the wires in the twisting gears are given four twists which is sufficient to securely fasten the ends of the wires together around the bales.

On the outer ends of the short shafts 52 are fixedly mounted worm gears 56 which are engaged with and operated by a series of worms 57 fixedly mounted on a worm shaft 58 which is revolubly mounted in suitable bearing brackets 59 on the outer bearing plate of the shafts 52. On one end of the worm shaft 58 is fixedly mounted a spur gear pinion 60, which is engaged with a power transmitting gear 61, which is loosely mounted on a short counter shaft 62 journaled in suitable bearing brackets on the side of the baling chamber as shown. Connected with or forming part of the gear 61 is one member of a clutch 63, the opposite member of which is connected with or forms part of a beveled gear pinion 64 which is also mounted on the shaft 62. The clutch member of the gear 61 is adapted to be shifted into engagement with the clutch member of the gear 64 whereby the motion of the latter is imparted to the gear 61 by means of a suitable clutch shifting mechanism comprising a bell crank shifting lever 65, one arm of which is in operative engagement with the clutch member 63 and the other arm of which is connected with a suitable intermittent operating mechanism. When the clutch member of the gear 61 is disengaged from the clutch member of the gear 64, and the gear 61 thus disconnected from its operating mechanism, said gear is positively locked against rotation by means of a stop pin 66 which is engaged with the recess 67 formed in the adjacent face of the gear 61 after the latter is shifted by the clutch operating mechanism.

Motion is imparted to the wire fastening and severing mechanism by a vertically disposed power transmitting shaft 68, which is revolubly mounted in suitable bearings on the main frame of the machine and has on its lower end a beveled gear 69 which meshes with a similar gear 70 forming part of or being connected with a spur gear pinion 71, which is in engagement with and is driven by the spur gear 35 on the crank shaft 33. On the upper end of the shaft 68 is a large beveled gear 72 with which is engaged a beveled gear pinion 73 keyed to a horizontally disposed shaft 74 which is mounted in suitable brackets on the main frame of the machine and which is provided with a key seat extending along the entire length of the shaft.

Slidably keyed to the shaft 74 and adapted to travel backward and forward with the bale frame are beveled gear pinions 75, which are engaged with the beveled gear pinions 64 on the shafts 62 of the wire fastening and severing mechanism hereinbefore described, whereby the gears 64 and their clutch members on said shafts 62 are continuously driven so that, when the clutch member of either of the gears 61 is thrown into engagement with the clutch member of its coacting gear 64, the motion of the latter is imparted to the gear 61 and through the same to the wire fastening and twisting devices of the respective baling chambers. It will be understood that the relative sizes of the power transmitting gears between the gear 35 and the wire twisting and severing devices is such that the latter will be given a proper number of revolutions at the desired time and that the mechanisms for operating the clutch shifting levers 65 are timed to operate the clutches 63 at the proper time for throwing the wire twisting and severing mechanism into and out of gear.

The bales, after being wired in the manner described are ejected from the baling chambers by means of a suitable ejecting mechanism hereinafter described. In order to provide for the ejecting of the bales, each of the baling chambers 4 and 5 is provided on one side with hinged doors 76, which are held in closed position by automatically operated latches comprising latch bars 77, one of which is provided at each end of the baling frame, being pivotally mounted on said frame at one end and provided at its opposite end with a beveled catch 78. The latches 77 are held in retracted or operative position by suitable springs 79 secured to the adjacent end of the baling frame, as shown. Each of the latches 77 is provided with a releasing lever 80, said levers being formed on a compound curve and being pivotally connected at one end to the latches 77 adjacent to their free ends. The opposite ends of the levers 80 project across and beyond the latches 77, and said ends of the levers are adapted to be brought into engagement with operating plates 81 arranged at the opposite ends of the main frame by the movement of the baling frame. When the ends of the levers 80 are thus brought into engagement with the operating plates, said levers are forced into engagement with the adjacent ends of the baling frame, and owing to their peculiar shape, are thereby rocked and caused to spring the latches outwardly, thus disengaging the catches thereon from the doors 76 and permitting the latter to be swung open by the pressure of the bale when forced out of the baling chambers by the ejecting mechanism. After a bale has thus been ejected and the baling frame started back toward the opposite end of the main frame, the doors will be brought into engagement with closing devices which are here shown as consisting of curved springs 82 secured to the adjacent side of the main frame, thus swinging said doors back to a closed position where they are caught and held by the catches 78 on the ends of the latch bars.

The bale ejecting mechanism comprises plungers 83 which are in the form of right angularly shaped bars slidably mounted on suitable cross bars arranged in one side of the main frame of the machine as shown. The plungers 83 are adapted to operate between two angle iron bars 84 forming part of the adjacent side of the baling chambers 4 and 5. The horizontal arms of the plunger bars 83 are pivotally connected at their outer ends to the upper ends of slotted operating bars 85, the lower ends of which are pivotally connected to the brackets 41 on the lower portion of the main frame. Mounted in suitable bearing brackets 86 projecting laterally from the side of the main frame is an ejector operating shaft 87 having on its outer ends cranks 88 which are engaged with the slots in the operating bars 85, whereby when said shaft is revolved, the bars 85 will be swung inwardly and outwardly to project and retract the ejector or plunger bars 83 into and out of the baling chambers, thus pushing the finished bales out of the chambers.

On the shaft 87 is fixedly mounted a sprocket gear 89 with which is connected, by a sprocket chain 90, a sprocket gear 91 loosely mounted on the crank shaft 33 of the machine. The sprocket gear 91 is provided with one member of a clutch 92, the opposing member 92' of which is keyed to the shaft 33 whereby, when the gear 91 and its clutch member are shifted into engagement therewith, said gear is driven by the shaft. The gear 91 is shifted to bring the clutch members into engagement by a suitable shifting mechanism comprising a rock shaft 93 which is revolubly mounted in suitable bearings in the lower portion of the main frame and has fixed thereon upwardly projecting arms 94 provided with inwardly extending pins which engage an annular groove 95 formed in the hub of the gear 91 as shown. Also fixed to the shaft 93 is an upwardly projecting trip arm 96 to which is connected a retracting spring 97, whereby the arm is drawn back and the shaft 93 rocked to retract and normally hold the gear 91 out of engagement with the clutch 92. In order to positively stop and hold the gear against rotation when disengaged from the clutch, I preferably provide a collar 98 which is loosely mounted on the shaft 33 and is securely fastened by a suitable bracket to the main frame of the machine. In one side of the collar 98 is formed a locking notch 99 with which is engaged a locking lug 100 formed on the adjacent end of the hub of the gear 91 whereby, when the gear is retracted from the clutch, said gear will be locked. The gear 91 is intermittently thrown into engagement with the clutch to operate the ejecting mechanism at the proper time by a trip mechanism comprising a pivotally mounted trip arm 101, provided above and below its pivotal connection with lever engaging fingers 102 which, when the arm is rocked in either direction, will swing the lever 96 and thereby rock the shaft 93 in the proper direction. The upper end of the trip arm 101 is engaged by triangular tripping blocks 103 which are pivotally mounted in suitable brackets secured to the under side of the baling frame whereby when the latter is moved back and forth to bring the baling chambers therein into position for receiving and ejecting the bales, said tripping blocks will be brought into engagement with the upper end of the trip arm, thereby actuating the same and the lever 96 to shift the gear 91 into operative engagement with the clutch on the shaft 33, as hereinbefore described. It will be noted that, owing to the pivotal connection and shape of the tripping blocks 103, the latter will operate the trip arm only when passing in one direction, and that after operating the arm said blocks will pass over the same to permit the baling frame to continue to the end of its travel. The tripping blocks and arm swing the lever 96 against the tension of the spring 97 and only hold said lever in position to engage the gear 91 with the clutch long enough to permit the gear to be revolved to a sufficient extent to bring the lug 100 out of alinement with the notch 99, after which the tripping blocks pass over the trip arm and the gear is then held in engagement with the fixed member of the clutch on the shaft 33 by the engagement of the lug 100 with the adjacent face of the collar 98 until the gear has made one complete revolution, and thus again brought the lug 100 opposite to the notch 99, at which time the spring 97 will retract the lever 96 and thus rock the shaft 93 thereby retracting the gear 91 and causing the lug 100 to again enter the notch 99, thus holding the gear against further rotation until the lever 96 is again tripped by the next movement of the baling frame.

It will be understood that the tripping blocks 103 are arranged in such position on the baling frame that they will operate the gear shifting mechanism at the proper time for operating the ejector mechanism, so that the ejectors will be projected into the baling chambers at the proper time for ejecting the finished bale therefrom, as hereinbefore described.

In order to positively prevent the operation of the shifting mechanism for the baling frame at the time when the plunger 28 is in an operative position or projected into either of the baling chambers, I provide a suitable locking mechanism. Said mechanism comprises levers 104 which are pivotally mounted at suitable positions in the main frame beneath the path of movement of the shifting devices, whereby when the baling frame has been brought to the end of its travel at either end of the main frame and the weighted crank arms 15 raised by the releasing devices 17 to disengage the threaded segmental blocks 10 from the feed shaft, said crank arms will be disposed immediately above the upper ends of the levers 104 which will prevent said arms from dropping and thus engaging the blocks 10 with the screw shaft should said crank arms be released by their regular supporting mechanism. The levers 104 are held in operative position by coiled springs 105 and are swung to inoperative positions against the tension of said springs by eccentrics 106 which are fixedly mounted on the crank shaft 33 of the plunger operating mechanism. The eccentrics 106 are arranged on the shaft 33 in such position that they will be brought into engagement with the levers 104 to swing the same to inoperative positions or from beneath the crank arms 15 only when the plunger is in an elevated position, thus positively preventing the operation of the shifting mechanism for the baling frame when the plunger is lowered or in either of the baling chambers.

The intermittent operating mechanism for the clutch shifting levers 65 hereinbefore referred to, comprises a rocking bar 107 pivotally mounted midway its ends on a cross bar 108 arranged across the space between the baling chambers at one side of the same and secured at its opposite ends to the angle iron corner bars of said chambers. The bar 107 is of such length that the ends thereof project across and engage the lower horizontal arms of the bell crank clutch shifting levers 65, said levers being pivotally mounted on a rod or shaft 109 arranged between and secured at its opposite ends to the baling chambers. Projecting downwardly from the bar 107 on opposite sides of the center of the same are trip arms 110, the lower ends of which are bifurcated and turned outwardly thus forming bearing ears between which are pivotally mounted trip pawls 111 and 112. These pawls are pivoted in the ears on the arms 110 in such manner that the upper ends of the pawls engage the outer sides of the arms 110 and thus prevent the pawls from swinging in but one direction. The pawls 111 and 112 are rounded on the inner edges at their lower ends as shown. Secured to the main frame of the machine, midway between the ends of the same and in position to be engaged by the trip pawls 111 and 112 is a trip rail 113, the opposite ends of which are turned downwardly or inclined at an angle as shown.

When the baling chambers are in the position shown in full lines in Fig. 12, the bale in the chamber 5 has been tied and is being discharged from the chamber while in chamber 4, a bale is being pressed. After the bale is pressed in chamber 4, the baling chambers are shifted to the right. In moving to this position, the pawls 111 and 112 are brought into engagement with the trip rail 113. When thus engaged the pawl 112 will rock back loosely on its pivotal connection with the arm 110 while the pawl 111 will ride up on the rail, thereby tilting the rocking bar 107 to the dotted line position shown in Fig. 12. The rounded end of the pawl and the inclined end of the rail facilitates the engagement of these parts. When the bar 107 has thus been rocked or tilted, the end thereof which engages the clutch lever for the wire twisting mechanism of the baling chamber 4 will rock said clutch lever, thereby engaging the clutch member 63 of the power transmitting gear 61, for the chamber 4, with the clutch member of the gear 64, whereby the motion of said gear 64 is imparted to the wire twisting mechanism of the chamber 4, and the bale therein securely tied or wired and the wires cut as hereinbefore described. After the rocking bar 107 and the pawls have passed clear across the trip rail 113 in the further movement of the baling chambers and the pawl 111 has thus become disengaged from the rail, the clutch shifting lever will be retracted or rocked in the opposite direction by a spring 114, provided for this purpose. When the clutch lever has thus been retracted, the clutch members of the gears 61 and 64 will be disengaged thus throwing the wire twisting and cutting mechanism of the baling chamber 4 out of gear. When the baling chambers are moved in the opposite direction, the pawl 112 is operatively engaged with the trip rail 113 and the operating mechanism of the wire twisting devices for the baling chamber 5 will be actuated in the same manner as the devices for the chamber 4, just described. It will be understood that the pawls 111 and 112 are the correct distance apart and the trip rail 113 is of the proper length and these parts so located with respect to each other that the clutch levers 65 will be operated at the proper time and the gears of the wire twisting mechanisms thereby held in engagement the proper length of time to effect the twisting and severing of the wires which tie the bales in the manner described.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:—

1. In a hay baling machine, a main frame, a baling frame slidably mounted therein, a shifting mechanism for said baling frame, means to actuate said shifting mechanism, and means to automatically connect the shifting mechanism with the baling frame and to disconnect it therefrom.

2. In a hay baling machine, a main frame, a baling frame slidably mounted therein, a screw shaft revolubly mounted in said main frame, shifting devices arranged on said baling frame and adapted to be engaged with said screw shaft whereby said baling frame is moved in one direction or the other, means actuated by the formation of a bale in said frame to engage said shifting devices with said screw, means to automatically release said shifting devices from the screw shaft when said baling frame has reached the limit of its travel in either direction, and means whereby the completed bales are ejected from said baling frame.

3. In a hay baling machine, a main frame, a feed box arranged in the upper portion thereof, a baling frame slidably mounted in said main frame, baling chambers arranged in said baling frame, a screw shaft adapted to shift said baling frame whereby said baling chambers are successively brought beneath said feed box, means carried by said baling frame and actuated by the formation of a bale therein to connect said frame with said shaft whereby the frame is moved in one direction or the other, releasing devices arranged at the opposite ends of said main frame and adapted to disengage said connecting devices from said shaft when the frame has reached the limit of its movement in either direction, a plunger adapted to force the hay from said feed box into the baling chambers of said baling frame, and means actuated by said screw shaft to operate said plunger at the proper time.

4. In a hay baling machine, a main frame, a feed box arranged therein, a baling frame slidably mounted in said main frame beneath said feed box, baling chambers formed in said baling frame, yieldingly supported bottoms arranged in said baling chambers, a right and left hand threaded screw shaft revolubly mounted in said main frame, threaded connecting blocks carried by said baling frame and adapted to be engaged with the threads of said shaft whereby said baling frame is moved in first one direction and then the other, weighted crank arms adapted to engage said blocks with said shaft, catches adapted to normally hold said crank arms in inoperative position and said blocks out of engagement with said shaft, a trip mechanism actuated by the yieldingly supported bottoms of said baling chambers from the pressure of a bale when formed therein whereby said catches are disengaged from said crank arms and the latter caused to engage the blocks with said shaft, thereby connecting the baling frame therewith to move the latter in one direction or the other, and releasing devices arranged at the opposite end of said main frame to engage and lift said crank arms into engagement with said catches, thereby releasing said blocks from the shaft and thus stopping the movement of the baling frame.

5. In a hay baling machine, a main frame, a feed box arranged therein, a baling frame slidably mounted in said main frame below said feed box, baling chambers in said frame, a plunger adapted to force the hay from said box into said baling chambers, a screw shaft revolubly mounted in said main frame, shifting devices carried by said baling frame and adapted to be automatically engaged with said screw shaft to move the frame in one direction or the other, an automatically operated locking mechanism adapted to prevent the operation of said shifting devices when said plunger is in engagement with the baling chambers, and means operated by said shaft to project and retract said plunger at the proper time.

6. In a hay baling machine, a main frame, a baling frame slidably mounted therein, baling chambers arranged in said baling frame, a feed box arranged above said baling frame, a shifting mechanism to move said baling frame back and forth thereby successively bringing said baling chambers beneath said feed box, a main plunger adapted to force the hay from said feed box into said baling chambers, a plunger operating mechanism, a hay pressing lever actuated by the movement of said plunger to force the hay into said feed box, and a feed plunger slidably mounted in said box and actuated by said plunger operating mechanism to push the hay in said box beneath said main plunger whereby the hay is forced into the baling chamber.

7. In a hay baling machine, a main frame, a baling frame slidably mounted therein, baling chambers arranged in said baling frame, a feed box, a shifting mechanism adapted to move said baling frame whereby the chambers therein are successively brought beneath said feed box, a plunger to press the hay into said baling chambers from said feed box, a series of bale binding wires adapted to be passed around said bales while the latter are being formed in said baling chambers, wire twisting and severing devices, and means operated by the movement of the shifting mechanism of said baling frame whereby the wire twisting and severing devices are automatically operated at the proper time.

8. In a hay baling machine, a main frame, a baling frame slidably mounted therein, baling chambers arranged in said baling frame, a feed box, a shifting mechanism adapted to move said baling frame whereby the chambers therein are successively brought beneath said feed box, a plunger to press the hay into said baling chambers from said feed box, a series of bale binding wires adapted to be passed around said bales while the latter are being formed in said baling chambers, a series of wire twisting gears arranged on each of said baling chambers and adapted to receive the ends of the wires passed around the bales when being formed whereby said ends are twisted together, a series of wire severing and holding devices adapted to operate in connection with said twisting devices to sever the wires after being twisted and to hold the ends of the wires in position to be again passed around the bales while being formed and an operating mechanism adapted to operate said twisting gears and severing devices at the proper time.

9. In a hay baling machine, a main frame, a baling frame slidably mounted in said main frame, baling chambers arranged in said baling frame, a feeding and pressing mechanism adapted to force the hay into said chambers, a wiring mechanism whereby the pressed bales are wired together, doors arranged in one side of said baling chambers, latches adapted to hold said doors in closed position, means to automatically release said latches at the proper time to permit said doors to be opened, an ejecting mechanism, means to operate said mechanism at the proper time for ejecting the finished bales from said baling chambers, and means to close the doors of said chambers after the bales have been ejected therefrom.

10. In a hay baling machine, a main frame, a baling frame slidably mounted therein, baling chambers arranged in said baling frame, a feeding and pressing mechanism adapted to force the hay into said baling chambers, means to shift said baling frame to bring said chambers successively beneath said feeding and pressing mechanism, a wiring mechanism whereby the pressed bales are bound together with a series of wires, ejecting plungers adapted to push the finished bales from said chambers, a plunger operating mechanism, and means to intermittently throw said operating mechanism into and out of gear whereby the ejecting plungers are operated at the proper time for ejecting the bales from said baling chamber.

11. In a hay baling machine, a main frame, a baling frame slidably mounted therein, baling chambers arranged in said baling frame, a plunger adapted to force hay into said baling chambers, a shifting mechanism adapted to be connected with said baling frame whereby the latter is moved at the proper time to successively bring said baling chambers beneath the plunger, a plunger operating mechanism actuated by said shifting mechanism to project and retract said plunger at the proper time, an ejecting mechanism adapted to push the finished bales from said baling chambers, said ejecting mechanism comprising a shaft, ejecting plungers operatively connected with said shaft, a driving mechanism to connect said shaft with said plunger operating mechanism, a clutch connection between said driving mechanism and said plunger operating mechanism, a clutch operating device, and means carried by said baling frame to intermittently engage said clutch operating mechanism whereby said shaft driving mechanism is thrown into and out of gear at the proper time to project and retract said ejecting plungers.

12. In a hay baling machine, a main frame, a baling frame slidably mounted therein, a screw shaft revolubly mounted in said main frame, shifting devices arranged on said baling frame and adapted to be engaged with said screw shaft whereby said baling frame is moved in one direction or the other, means actuated by the formation of a bale in said frame to engage said shifting devices with said screw, and means to automatically release said shifting devices from the screw shaft when said baling frame has reached the limit of its travel in either direction.

13. In a baling machine, the combination of a main frame, a baling frame mounted thereon, a feeding screw mounted in the main frame, means for continuously rotating said screw members on the bottom of the baling frame adapted to engage said screw, and means whereby said members are automatically engaged with and disengaged from the screw.

14. In a baling machine, the combination of a main frame, a feed box arranged in the upper portion thereof, a baling frame slidably mounted in said main frame, baling chambers arranged in said baling frame, means to shift said baling frame whereby said baling chambers are successively brought beneath said feed box, devices carried by said baling frame and actuated by the formation of a bale therein to connect said frame with said shifting means, releasing devices arranged at the opposite ends of said main frame and adapted to disengage said connecting devices from said shifting means when the frame has reached the limit of its movement in either direction, a plunger adapted to force material from said feed box into the baling chambers, and actuating mechanism common to said plunger and the shifting means.

15. In a baling machine, the combination of a main frame, a feed box arranged therein, a baling frame slidably mounted in said main frame beneath said feed box, baling members formed in said baling frame, a screw shaft revolubly mounted in said main frame, threaded connecting blocks carried by said baling frame and adapted to be engaged with said shaft whereby said baling frame is moved in first one direction and then the other, weighted crank arms adapted to engage said blocks with said shaft, catches adapted to normally hold said crank arms in inoperative position and said blocks out of engagement with said shaft, a trip mechanism actuated by the pressure of a bale formed in the baling chamber whereby said catches are disengaged from said crank arms and the latter caused to engage the blocks with said shaft, and releasing devices arranged at the opposite ends of said main frame to engage and lift said crank arms into engagement with said catches, thereby releasing said blocks from the shaft and stopping the movement of the baling frame.

16. In a baling machine, the combination of a main frame, a baling frame slidably mounted thereon and having a plurality of baling chambers, yielding bottoms in said chambers, means for feeding material into the baling chambers, means for shifting the baling frame to bring the baling chambers successively into operative relation to the feeding means, means for compressing material in the baling chamber, means actuated by the yielding bottoms to connect the baling frame with the shifting means when a bale has been formed, and means for disconnecting the baling frame from the shifting means when an empty baling chamber has been brought to the baling position.

17. In a baling machine, the combination of a main frame, a baling frame slidably mounted in said main frame, baling members in said frame, a compressing plunger adapted to operate in said baling chambers, means for shifting the baling frame, devices carried by said baling frame and adapted to be automatically engaged with said shifting means to move the frame in one direction or the other, an automatically operated locking mechanism adapted to prevent the operation of said devices when said plunger is in engagement with the baling chambers, and suitable operating mechanism.

18. The combination of a main frame, a baling frame slidably mounted thereon, means for shifting the baling frame, members on the baling frame to engage said shifting means when a bale has been formed, means for forming a bale in the baling frame, means for releasing said members from the shifting means when the baling frame has been brought into position to form a bale, and means for locking said members out of engagement with the shifting means during the formation of a bale.

19. The combination of a main frame, a baling frame slidably mounted thereon, a screw mounted in the main frame below the baling frame, means for continuously rotating said screw, a threaded block pivotally mounted on the baling frame in position to engage said screw, a rock shaft connected with said block to swing into engagement with the screw, a pivoted support normally engaging the rock shaft to hold the threaded block out of engagement with the screw and actuated by the formation of a bale to release said shaft, and means on the main frame actuated by the baling frame to return said rock shaft to its engagement with the pivoted support.

20. The combination of a main frame, a baling frame slidably mounted thereon, a screw mounted in the main frame below the baling frame, means for continuously rotating said screw, a threaded block pivotally mounted on the baling frame in position to engage said screw, a rock shaft connected with said block to swing into engagement with the screw, a pivoted support normally engaging the rock shaft to hold the threaded block out of engagement with the screw and actuated by the formation of a bale to release said shaft, means on the main frame actuated by the baling frame to return said rock shaft to its engagement with the pivoted support, and means to prevent movement of the rock shaft during the formation of a bale.

21. The combination of a main frame, a baling frame slidably mounted thereon, a screw mounted in the main frame below the baling frame, means for continuously rotating said screw, a threaded block pivotally mounted on the baling frame in position to engage said screw, a rock shaft connected with said block to swing into engagement with the screw, a pivoted support normally engaging the rock shaft to hold the threaded block out of engagement with the screw and actuated by the formation of a bale to release said shaft, and angle levers fulcrumed on the main frame and having one arm engaging the rock shaft and its other arm projecting into the path of the baling frame whereby the rock shaft will actuate to release the threaded block from the screw when the baling frame has reached its limit of movement.

22. The combination of a main frame, a baling frame slidably mounted thereon, a screw mounted in the main frame below the baling frame, means for continuously rotating said screw, a threaded block pivotally mounted on the baling frame in position to engage said screw, a rock shaft connected with said block to swing into engagement with the screw, a pivoted support normally engaging the rock shaft to hold the threaded block out of engagement with the screw and actuated by the formation of a bale to release said shaft, means on the main frame actuated by the baling frame to return said rock shaft to its engagement with the pivoted support, a lever normally projecting under the rock shaft to lock the same against movement, a main driving shaft, and means on said shaft to release said lever from the rock shaft.

23. The combination of a main frame, a baling frame slidably mounted thereon, means for shifting the baling frame, means mounted centrally on the main frame for forming a bale in the baling frame, ejecting plungers mounted in the main frame at the ends thereof, means for moving said plungers to and from the baling frame, and means controlled by the baling frame for throwing said plunger-moving means into and out of operative position.

24. The combination of a main frame, a baling frame slidably mounted thereon, means for shifting the baling frame, means mounted centrally on the main frame for forming a bale in the baling frame, ejecting plungers mounted in the main frame at the ends thereof, a driving shaft, mechanism for reciprocating the ejecting plungers, a clutch adapted to connect said mechanism with the driving shaft, and means on the baling frame for shifting said clutch.

25. The combination of a main frame, a baling frame slidably mounted thereon, means for shifting the baling frame, means mounted centrally on the main frame for forming a bale in the baling frame, ejecting plungers mounted in the main frame at the ends thereof, a driving shaft, mechanism for reciprocating the ejecting plungers, a clutch adapted to connect said mechanism with the driving shaft, a lever fulcrumed on the main frame and adapted to operate said clutch, a rocking bar mounted on the main frame and bearing against the lever, means for holding said lever against said rocking bar, and means on the baling frame for actuating said bar.

26. The combination of a main frame, a baling frame slidably mounted on the main frame and having a plurality of baling chambers, means for shifting the baling frame, means for forming a bale in each of the baling chambers successively, doors hinged on the baling frame to close the baling chambers, latch bars at the ends of the baling frame pivoted at one end to said frame and adapted at the opposite end to engage and hold the doors, a releasing lever on each latch bar, and stops at the ends of the main frame adapted to be engaged by the release levers to disengage the latch bars from the doors.

27. The combination of a main frame, a baling frame slidably mounted therein and having a pair of baling chambers, means for shifting the baling frame, wire twisting devices mounted on one side of each baling chamber, a reel mounted at each end of the main frame whereby wire passed from said reel to the twisting devices on the adjacent baling chamber will pass across said chamber when it is in position to receive material, and means for operating the twisting devices on the separate baling chambers alternately.

28. The combination of a main frame, a baling frame slidably mounted therein and having a plurality of baling chambers, wire twisters mounted on the sides of the baling chambers, operating mechanism for said twisters, clutch members arranged to connect and disconnect said mechanism, and means actuated by the movement of the baling frame to automatically operate said clutch.

29. The combination of a main frame, a baling frame slidably mounted therein and having a plurality of baling chambers, wire twisters mounted on the sides of the baling chambers, operating mechanism for said twisters, clutch members arranged to connect and disconnect said mechanism, levers mounted on the baling frame and each connected with a clutch member, a vibratory trip arm pivotally mounted between said levers and having its ends in engagement therewith, and means on the main frame for actuating said trip arm.

30. The combination of a main frame, a baling frame slidably mounted therein and having a plurality of baling chambers, wire twisters mounted on the sides of the baling chambers, operating mechanism for said twisters, clutch members arranged to connect and disconnect said mechanism, levers mounted on the baling frame and each connected with a clutch member, a vibratory trip arm pivotally mounted between said levers and having its ends in engagement therewith, a trip rail on the main frame in the path of said trip arm to be engaged by the end of the same.

31. The combination of a main frame, a baling frame slidably mounted therein and having a plurality of baling chambers, wire twisters mounted on the sides of the baling chambers, operating mechanism for said twisters, clutch members arranged to connect and disconnect said mechanism, levers mounted on the baling frame and each connected with a clutch member, a vibratory trip arm pivotally mounted between said levers and having its ends in engagement therewith, dogs pivoted to the ends of said arm, and adapted to bear against the outer sides thereof, and a trip rail secured on the main frame and having inclined ends, and an intermediate horizontal portion on which said dogs may ride to vibrate the trip bar alternately in opposite directions.

In testimony whereof I have hereunto set my hand in presence of two subscribing witnesses.

CLIFTON L. INMAN.

Witnesses:
JAS. L. CONLEY,
A. S. SALQUIST.